A. G. BRUSH.
Potato-Diggers.
No. 136,028.
Patented Feb. 18, 1873.
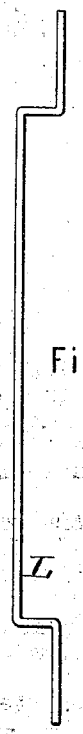
Fig. 5.
Fig. 1.
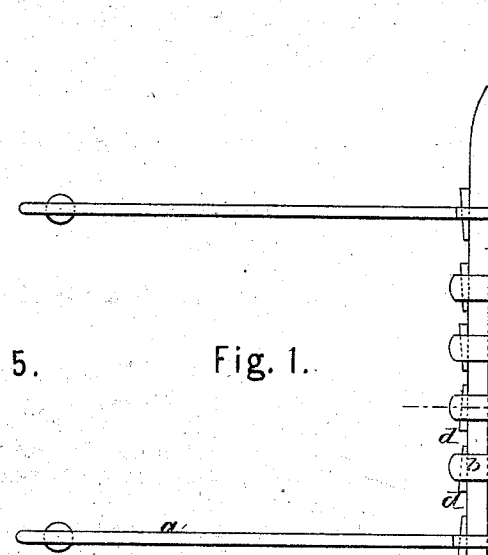
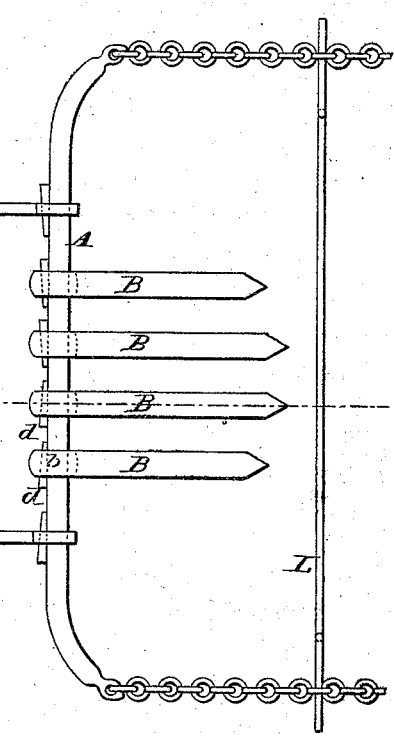
Fig. 2.
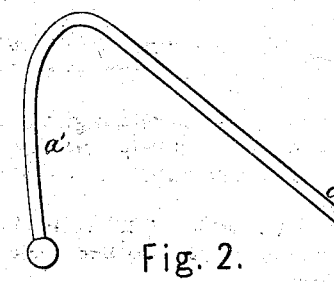
Fig. 3.       Fig. 4.
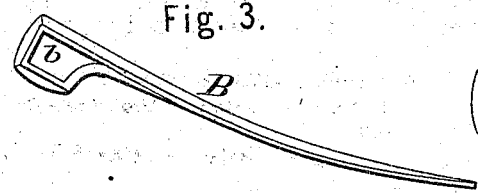
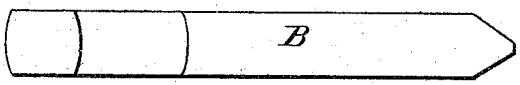
WITNESSES.
Villette Anderson.
Phil C. Masi.
INVENTOR.
Addison G. Brush,
Chapman Foster & Co.,
Attorneys.
AM. PHOTO-LITHOGRAPHIC CO. N.Y. (OSBORNE'S PROCESS.)

UNITED STATES PATENT OFFICE.

ADDISON G. BRUSH, OF SUSQUEHANNA DEPOT, PENNSYLVANIA.

IMPROVEMENT IN POTATO-DIGGERS.

Specification forming part of Letters Patent No. 136,028, dated February 18, 1873.

*To all whom it may concern:*

Be it known that I, ADDISON G. BRUSH, of Susquehanna Depot, in the county of Susquehanna and State of Pennsylvania, have invented a new and valuable Improvement in Potato-Diggers; and I do hereby declare that the following is a full, clear, and exact description of the construction and operation of the same, reference being had to the annexed drawing making a part of this specification, and to the letters and figures of reference marked thereon.

Figure 1 of the drawing is a top view of my potato-digger. Fig. 2 is a section of same. Figs. 3, 4, and 5 are details of same.

This invention has relation to potato-diggers; and it consists in the construction and novel arrangement of the curved tilting crosshead and the adjustable tines and handles, all substantially as and for the purpose hereinafter described.

Referring to the drawing, A designates a four-sided rectangular head, having its ends curved forward, so that when they rest on the ground the heads may be tilted forward and backward. B designates the tines, which are curved upward at their points, and have, at their rear ends, rectangular sockets $b$, through which the head A passes. The tines may be adjusted on the head to any desired distance apart, and are held rigid by means of wedges $d$, driven into the sockets behind the head A. The head A also passes through rectangular sockets $b'$ in the forward ends of handles $a$, which latter are also adjustable, and are held secure by means of wedges $d'$. At their rear ends these handles are bent down, as shown, the arms $a'$ being elongated to enable the operator to hold and guide the implement at any pitch without the necessity of altering the position of his hands; also, to admit of the implement being controlled by a man or boy.

The implement, as shown, is designed for digging two rows of potatoes at a time. The horse is hitched to the chains K, and walks between the rows.

L designates a rod connecting the chains in front of the tines, and serving the purpose of a vine-clearer.

Having fully described my invention, what I claim as new, and desire to secure by Letters Patent, is—

1. The improved potato-digger, having the head A with its ends bent forward, and holding the adjustable tines B, substantially as specified.

2. The adjustable tines B, in combination with the head A and wedges $d$, substantially as described.

3. In a potato-digger, the adjustable handles $a$, having the elongated depending arms $a'$, and applied to the head A, substantially as specified, and for the purpose set forth.

4. The vine-clearer L, connecting and supported by the chains K, substantially as specified.

In testimony that I claim the above I have hereunto subscribed my name in the presence of two witnesses.

ADDISON G. BRUSH.

Witnesses:
JOHN C. COOK,
RICHARD S. DENNIS.